No. 722,224. PATENTED MAR. 10, 1903.
L. B. GAYLOR.
AUTOMOBILE.
APPLICATION FILED DEC. 6, 1902.
NO MODEL.

Witnesses
Geo. M. Gaylor.
P. M. Dresbach.

Leonard B Gaylor Inventor
By his Attorney Phillips Abbott.

UNITED STATES PATENT OFFICE.

LEONARD B. GAYLOR, OF NEWTON CENTER, MASSACHUSETTS.

AUTOMOBILE.

SPECIFICATION forming part of Letters Patent No. 722,224, dated March 10, 1903.

Application filed December 6, 1902. Serial No. 134,066. (No model.)

*To all whom it may concern:*

Be it known that I, LEONARD B. GAYLOR, a citizen of the United States, and a resident of Newton Center, county of Middlesex, and State of Massachusetts, have invented a certain new and useful Improvement in Automobiles, of which the following is a full, clear, and exact description, reference being had to the accompanying drawings, in which—

Figure 1:
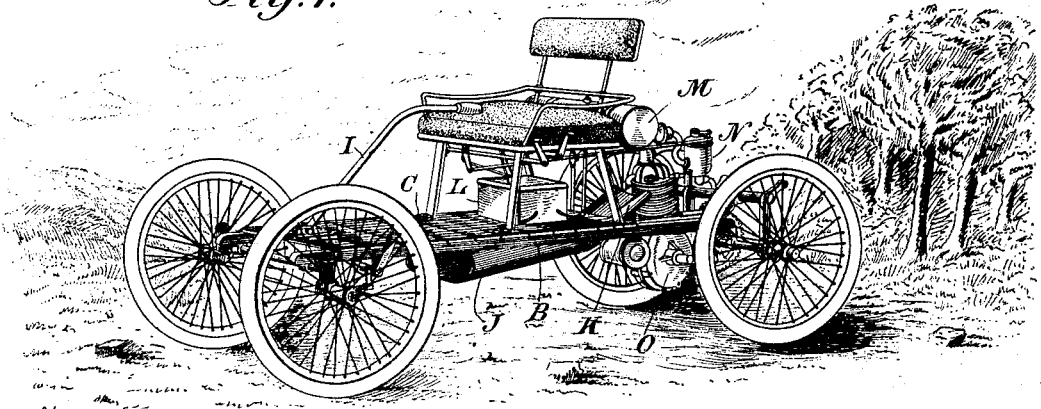
Figure 2:
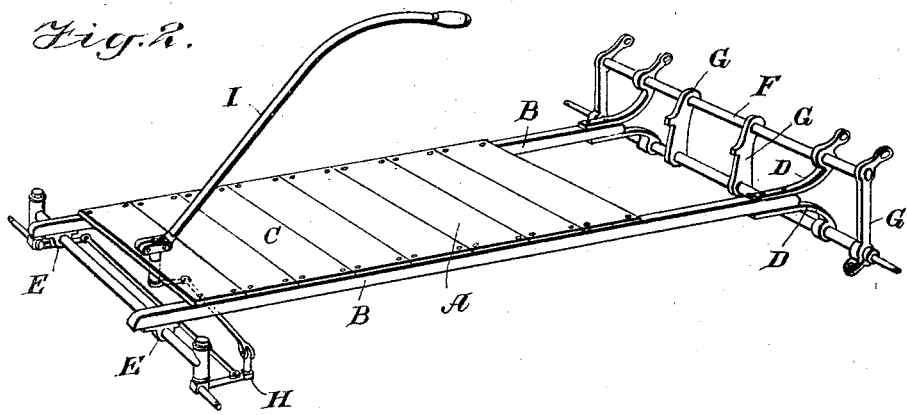
Figure 3:
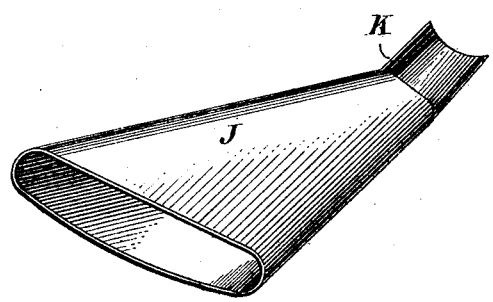

Figure 1 illustrates a perspective view of the automobile complete. Fig. 2 illustrates a perspective view of the framework or body part of the automobile. Fig. 3 illustrates a perspective view of a wide-mouthed funnel-shaped chute attached to the under side of the body of the vehicle, whereby a forced air-draft may be thrown upon the motor to cool it.

Referring to the drawings, A illustrates the body of the vehicle. In its simplest form it consists of two longitudinally-extending side bars or beams B B, which I prefer to make of some elastic and strong wood, such as hickory, upon which is mounted a platform C C, which may be made of wood, as illustrated in Fig. 2. The side bars B are rigidly connected to the front and rear axles, so that they are maintained in a position of parallelism with each other and at right angles to the axial line of the vehicle. The special means of attaching the side bars to the axle is immaterial; but I prefer to employ the braces D D at the rear axle and suitable bearings E E at the front axle.

F is a framework supported by uprights G or in any other suitable manner upon the rear axle, upon which the motor, carbureter, and such other parts as may be necessary are mounted, so that they are preferably entirely carried by the rear axle.

H is the ordinary French style of steering knuckle and gearing, which may be actuated by a steering-handle I or by a wheel or in any other preferred manner.

J is a wide-mouthed funnel-shaped chute, preferably made of metal and attached to the under side of the platform of the vehicle, gradually contracting as it extends rearwardly and terminating in a mouthpiece or spout K, which opens directly upon the motor. I prefer to employ the mouthpiece or delivery-spout K, which may be inclosed, as shown in Fig. 3, or open, as shown in Fig. 1, because thereby the air-blast is delivered more directly upon the motor; but in many instances the construction will be such that no spout will be necessary.

L is a case which may inclose the battery.

M is the gasolene-tank, N the carbureter, and O the motor.

My improved automobile is supplied with suitable brake mechanism, suitable devices for operating the sparker and the carbureter, with reversing mechanism, &c., and it obviously may be provided with a suitable front guard or dash.

I call attention to the following advantages possessed by my invention over all other forms of automobiles of this general class known to me: In the first place it is extremely simple. In automobiles as heretofore constructed it has been necessary to interpose between the rigid body and the running-gear expensive and sometimes complex spring systems, so as to relieve the passengers of the motor action and jars and shocks from the running-gear. Under my construction the motor is or may be carried entirely upon the rear axle and has no connection with the body of the vehicle, and also owing to the fact that the body of the vehicle is supported upon a resilient or elastic platform it affords all the cushioning necessary, and the same structure—to wit, the platform with its side bars—serves also as the frame for the vehicle as a whole, since it and it alone constitutes the part that binds the two axles together and holds them rigidly in parallelism. I employ no springs, nor any reach, nor any substitute for them. Also the wide-mouthed air-funnel automatically directs a column of cool air upon the motor when in operation, thus reducing its temperature, and the more intense the action of the motor—*i. e.*, the higher the speed, during which the motor would be especially heated—the greater becomes the draft of cool air. In other words, the cooling of the motor is automatically adjusted to its degree of heat.

It will be obvious to those who are familiar with such constructions that the battery, the gasolene-tank, and other parts illustrated may be located upon the vehicle otherwise than as shown, as may be preferred. Also, although I prefer to make the body of the vehicle in the form illustrated—that is to say, two simple hickory side bars with an ordinary wooden platform thereon—any other suitable construction whereby an elastic or yielding platform or body is provided which resiliently supports the load and at the same time fulfils the function of holding the two axles in parallelism may be substituted therefor.

Having described my invention, I claim—

1. In a motor-vehicle the combination of a motor supported otherwise than upon the body of the vehicle, an elastic platform which connects two transverse axles and holds them in parallelism, a seat mounted on the platform, wheels on the ends of the axles and means for operating two of said wheels for the purpose of steering.

2. In a motor-vehicle the combination of a motor, a platform or frame which rests upon and alone connects two transverse axles and holds them in parallelism, a funnel having an enlarged and forwardly-presented mouth fastened to the under side of the platform and discharging upon the motor, a seat mounted upon the platform, wheels on the ends of the axles and means for operating two of said wheels for the purpose of steering.

In testimony whereof I have signed my name to this specification in the presence of two subscribing witnesses.

LEONARD B. GAYLOR.

Witnesses:
CHARLES W. WOLF,
JAMES W. DOLAN.